United States Patent [19]
DePasquale et al.

[11] Patent Number: 4,536,756
[45] Date of Patent: Aug. 20, 1985

[54] PRESSURE INDICATOR AND ALARM

[76] Inventors: Michael DePasquale, 779 Tiffany Ave., River Vale, N.J. 07675; William S. Adam, 43 W. Fairmount Ave., Maywood, N.J. 07607

[21] Appl. No.: 558,048
[22] Filed: Dec. 5, 1983
[51] Int. Cl.³ .............................................. G08B 21/00
[52] U.S. Cl. .................................... 340/626; 340/688; 340/693
[58] Field of Search ............... 340/688, 626, 693, 546, 340/678; 324/157; 73/717, 723, 733, 509, 519, 520; 200/61.41, 56 R

[56] References Cited

U.S. PATENT DOCUMENTS

| | | | |
|---|---|---|---|
| 1,009,285 | 11/1911 | Crowley | 340/546 X |
| 1,968,866 | 8/1934 | Ames | 340/678 X |
| 2,435,514 | 2/1948 | Ross | 340/678 |
| 2,440,861 | 5/1948 | Lamb | 324/157 X |
| 3,192,517 | 6/1965 | Werlin | 340/546 |
| 3,506,911 | 4/1970 | Stone | 340/678 X |
| 3,773,044 | 11/1973 | Wallace | 340/693 X |
| 4,168,495 | 9/1979 | Sweeney | 340/546 |
| 4,275,393 | 6/1981 | Johnston | 340/688 |

Primary Examiner—James L. Rowland
Assistant Examiner—Daniel Myer
Attorney, Agent, or Firm—Donald R. Heiner

[57] ABSTRACT

A device to be used in conjunction with oxygen cylinders or other gas cylinders which will sound a warning and/or flash a light when the gas supply is running low and the cylinder is in need of replacement. A pin is inserted through a lens which normally is placed over a gas gauge dial wherein the gauge dial has a standard indicator arm which moves when the pressure decreases. When the indicator arm moves, normally in a counterclockwise direction, it will make contact with the pin when the level in the tank has been reduced to a point where it should be replaced. This will then complete an electrical circuit which would cause an alarm to sound and/or a light to flash. The circuit comprises essentially two lead wires each connected to a battery with one of the leads connected to a metal part of the regulator and another lead connected to the pin associated with the gauge. Any suitable device, such as alligator clips, may be used to connect one wire to the pin and the other wire to the metal part of the regulator.

7 Claims, 7 Drawing Figures

PRESSURE INDICATOR AND ALARM

BACKGROUND OF THE INVENTION

This invention relates generally to a device to be used in conjunction with oxygen cylinders or other gas cylinders which will sound a warning and/or flash a light when the gas supply is running low and the cylinder is in need of replacement. The improvement generally relates to the regulator-valve portion of the cylinder. The intention of the invention is to provide a means other than observing the gauge to know when to replace a gas cylinder.

A pin is inserted through a plastic or glass lens which normally is placed over a gauge dial. When the indicator arm moves, normally in a counterclockwise direction, it will make contact with the pin when the level in the tank has been reduced to a point where it should be replaced. This will then complete an electrical circuit which would cause an alarm to sound and/or a light to flash. The circuit comprises essentially the two lead wires each connected to a battery with one of the leads connected to a metal part of the regulator and another lead connected to the pin associated with the gauge. Any suitable device, such as alligator clips, a metal chain, a clip or hook, or a magnet, etc. may be used to connect one wire to the pin and the other wire to the metal part of the regulator.

The invention could essentially be provided in kit form which would comprise a lens cover with pin, a "black box" containing a battery, piezo alert, light, and necessary electric lead wires and some means such as a magnet, chain, clip, or alligator clips, for grounding the device to the regulator-valve portion of the cylinder.

PRIOR ART

A Search of the prior art uncovered U.S. Pat. Nos. to Johnston, 4,275,393, Coughlin 130,281 and Earll 226,165 which appear to show additional indicators used in conjunction with a standard needle gauge to sense when a predetermined change in pressure has been reached inside of a gas supply.

The Johnston Patent discloses a pressure sensing device having a light source, and an optical sensor for externally sensing a change in the pressure within a sealed system comprising a conventional gauge. In this Patent, illumination from the light source is reflected off the gauge dial and detected by the optical sensor. When the pressure changes a predetermined amount the needle on the gauge moves so as to interrupt the illumination reaching the optical sensor. This Patent varies substantially from the instant invention in that it is obviously more expensive and complicated due to the light source and optical sensor.

The Coughlin Patent discloses a more primitive version of a supplemental pressure indicator comprising a battery source and alarm hooked up to a standard pressure gauge. The Earll Patent also discloses a generally similar pressure gauge to that shown in Coughlin.

A Search of the prior art also uncovered U.S. Pat. Nos. to La Chapelle 4,016,536; Murphy et al 3,114,903; and, Jones 2,923,786 all of which represent various alternative embodiments of the same general arrangement.

None of these Patents is seen to disclose a pin inserted through a gauge lens with the specifics of the electrical circuit along with the combination of the piezo alert and light system which is attached to the regulator by means of a steel clip or other method as disclosed herein.

SUMMARY OF THE INVENTION

There is disclosed herein a pressure indicator and alarm system to be used in conjunction with oxygen or other gas cylinders which device will sound a warning and/or flash a light when the gas supply is running low and the cylinder is in need of replacement. The improvement herein generally relates to the regulator-valve portion of the cylinder.

Well-known in the art is a gas cylinder under pressure comprising a regulator-valve for regulating the flow of gas from a cylinder to an end use. This system further comprises a pressure gauge which, when visually inspected, gives a readout of the pressure remaining in the tank. The gauge associated with the regulator-valve has a normally counterclockwise rotating indicator which points to various markings inscribed on the gauge face which indicates the amount of pressure remaining. A lens of glass or plastic or other suitable material covers the face of the gauge.

In the instant invention a relatively small metallic pin is inserted through the gauge lens but does not contact the face of the gauge itself. By properly positioning or rotating the lens the pin will be fixed at a predetermined gas cylinder pressure below which the cylinder should be replaced. When the indicator arm, moving in a counterclockwise direction, makes contact with the pin, it will cause an electrical circuit to be completed which will then sound an alarm and/or flash a light thereby giving proper warning of the reduced pressure and the need to replace the cylinder. This will alleviate the necessity of having to visually inspect the face of the gauge to determine when there is need of replacing the cylinder.

The warning device is affixed to the regulator in any well-known manner such as by way of a steel clip, magnet, chain, or any other similar device which would ground a warning or alert system and complete an electrical circuit. Another lead wire is affixed to the pin extending through the gauge lens which will cause the electric circuit to be completed when the indicator arm of the gauge comes in contact with the pin.

As will be more fully described below the warning device comprises a small battery, a piezo alert audible warning device, and, a light source. Both the light source and the piezo alert are connected to the battery such that when the electrical circuit has been completed the piezo alert will sound and the light source will flash thus alerting an attendant to change the cylinder.

Thus, in summary, the invention provides both an audible and visual indication when gas pressure in a closed cylinder has reached a predetermined level.

There are essentially three basic methods by which the audible, light, and battery box system can be attached to a metal portion of the gas cylinder and/or metal portion of the regulator-valve to ground the system and complete the electrical circuit.

In one method, the warning system is hung from the regulator-valve by means of a beaded metal chain. This chain would then form one leg of the electrical circuit. An electrical lead wire runs from the minus pole of the battery to the piezo alert audible warning device and another electrical lead wire is run from the minus pole of the battery to the light source. A third electrical wire runs from the piezo alert audible warning device to the beaded chain and a fourth electrical wire is run from the plus pole of the battery to an alligator clip or banana clip. The alligator clip or banana clip is then attached to the pin inserted through the face of the gauge dial.

In another method, the warning device is hung from a metal portion of the gauge-valve system by means of a metal clip thereby forming one leg of the electrical circuit. In this method, one electrical lead wire is run from the minus pole of the battery to the piezo alert audible warning device and a second electrical lead wire is run from the minus pole of the battery to the light source. A third electrical lead wire is run from the piezo alert audible warning device to the light source and then to the metal clip. A fourth electrical lead wire is run from the plus pole of the battery to an alligator clip or banana clip which, again, is then connected to the pin inserted through the face of the gauge thereby completing the electrical circuit.

In the third basic method, the audible-light source battery system is secured to the gas cylinder or other metal portion of the system by means of a magnet which forms one side of the warning device system. In this method, one electrical lead wire is run from the minus pole of the battery to the piezo alert audible warning device and a second electrical lead wire runs from the minus pole of the battery to the light source. A third electrical lead wire runs from the light source to the piezo alert audible warning device and to the magnet and a fourth electrical lead wire runs from the plus pole of the battery to an alligator clip or banana clip which, again, is connected to the pin inserted through the face of the dial gauge thereby completing the electrical circuit.

In any of these alternate embodiments when the needle or indicator arm of the gauge rotates in its normal counterclockwise direction it will make contact with the metal pin inserted through the face of the dial when a predetermined minimum pressure level in the tank has been reached. At this point the electrical circuit will be completed and the piezo alert warning system will sound and the lignt source will flash.

It is to be clearly understood that there may be other methods of attaching the warning device sufficiently to the metal portion of the system to ground and complete the electrical circuit when the rotating indicator arm comes in contact with the pin.

The principal object of this invention is to provide a pressure indicator and alarm system to be used in conjunction with gas cylinders to audibly and visually alert a user or attendant when the cylinder needs to be replaced.

Another object of the invention is to provide a device to be used in conjunction with gas cylinders, such as oxygen cylinders, which will sound a warning and/or flash a light when the gas supply is running low and the cylinder is in need of replacement.

Another object of the invention is to provide an audible-visual warning device to be used in conjunction with gas cylinders wherein a pin is inserted through a lens which normally is placed over a gas gauge dial wherein the gauge dial has a standard indicator arm which moves when the pressure decreases.

Another object of the invention is to provide a device to be used in conjunction with gas cylinders which will sound a warning and/or flash a light when the gas supply is running low and the cylinder is in need of replacement wherein, when the indicator arm moves, normally in a counterclockwise direction, it will make contact with the pin when the level in the tank has been reduced to a point where it should be replaced.

Another object of the invention is to provide a device to be used in conjunction with gas cylinders which will sound a warning and/or flash a light when the gas supply is running low and the cylinder is in need of replacement wherein the device may be attached to a metal portion of the system by any suitable metal device such as alligator clips, a metal chain, a clip or hook, or a magnet to ground the device and form one leg of the electrical circuit.

With these and other objects, the nature of which will become apparent, the invention will be more fully understood by reference to the drawings, and the accompanying detailed description and claims.

IN THE DRAWINGS

Figure 1:
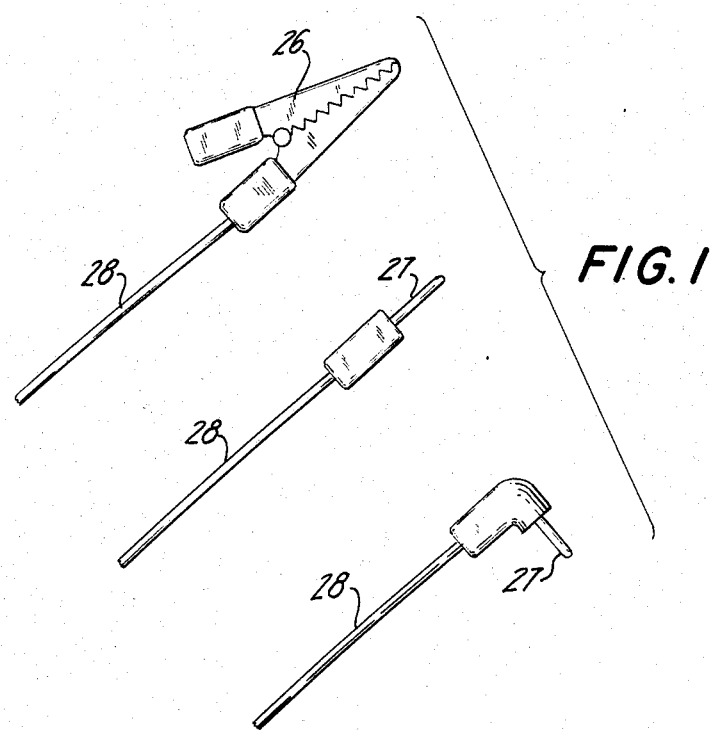
FIG. 1 shows an electrical lead wire connected to an alligator clip and banana clips.
Figure 2:
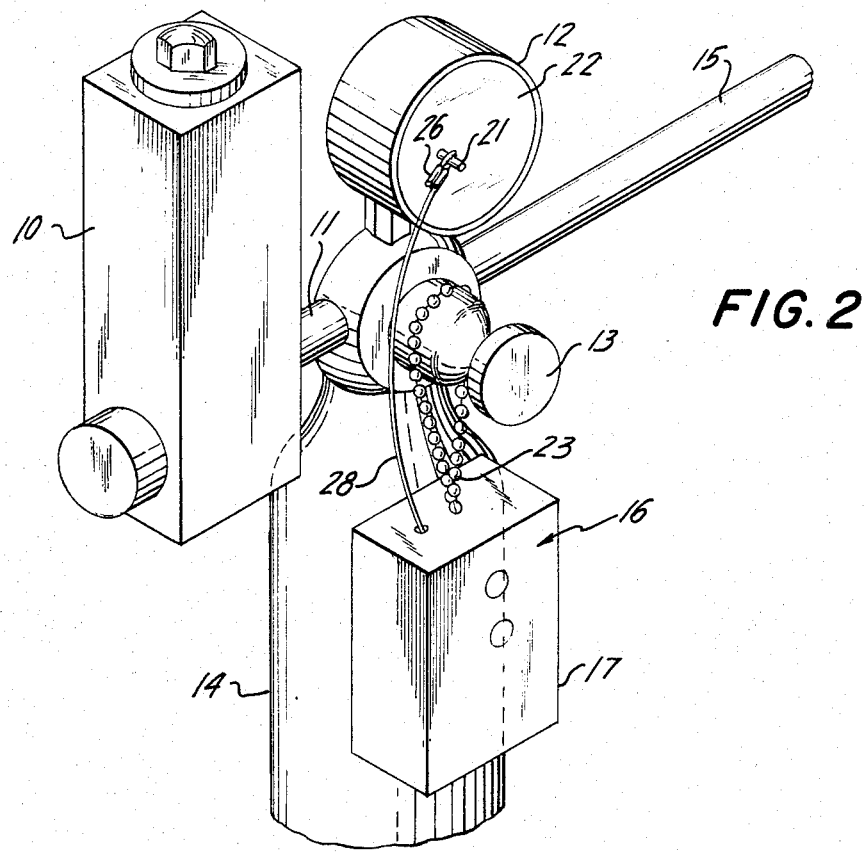
FIG. 2 shows a regulator valve and pressure gauge having the warning device hanging from a metal portion of the regulator valve by means of a beaded metal chain.
Figure 4:
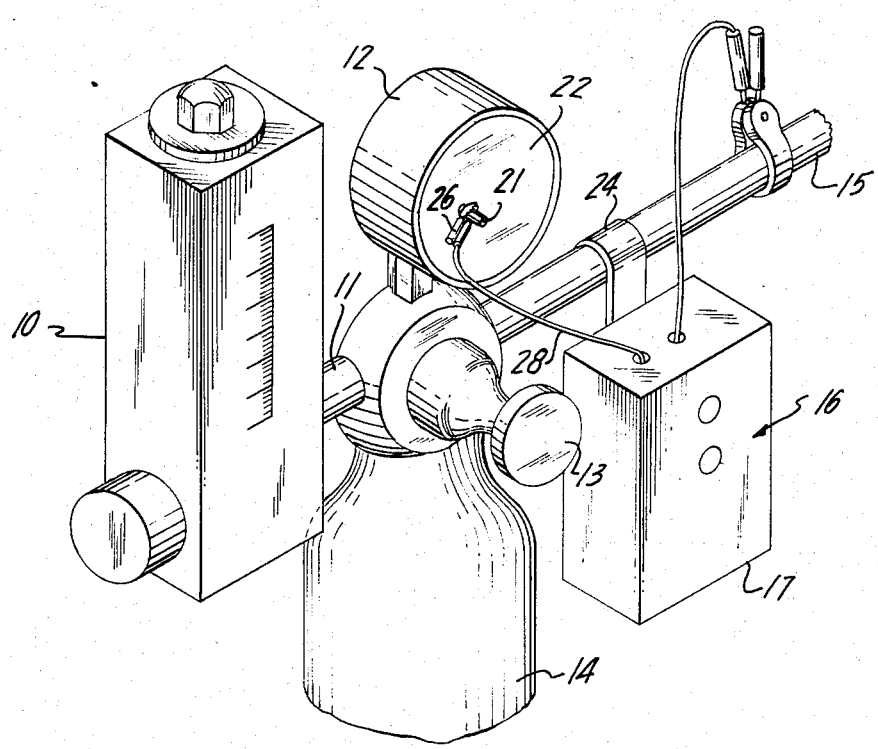
FIG. 4 is a view similar to FIG. 2 showing the warning device attached to a metal portion of the valve-regulator system by means of a metal clip and further showing the alligator clip attached to a pin inserted through the face of the gauge dial.
Figure 6:
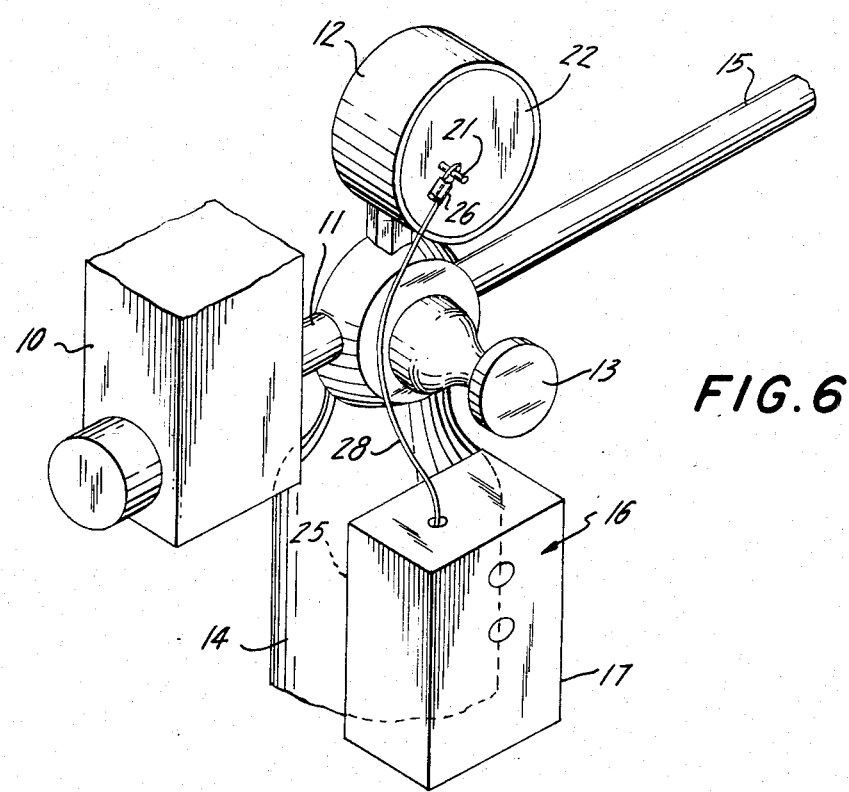
FIG. 6 is a view similar to FIG. 2 but showing a portion of a gas cylinder having the warning device attached thereto by means of a magnet.

Referring now to the drawings there is shown in FIGS. 2, 4, and 6 a standard oxygen or other gas regulator 10 connected by suitable piping 11 to a standard pressure gauge such as shown at 12 and valve as shown at 13. The regulator, pressure gauge, and valve are suitably attached to a gas cylinder such as partially shown as item 14. The discharge from the cylinder and regulator - valve combination to its end use is through suitable piping such as shown at 15. Items 10-15 are standard well-known items currently used in the art for regulating and monitoring the pressure and flow of a gas under pressure from a cylinder to an end use.

The pressure indicator and alarm system of this invention is shown generally as 16 in FIGS. 2-8.

The system comprises a housing 17 containing a small battery, such as a 9 volt battery, 18, a piezo alert buzzer 19, and a light source 20. The battery, piezo alert, and light source are properly electrically wired together as will be more fully described below to cause the alarm to sound and light to flash when the gas pressure contained in cylinder 14 reaches a pre-determined minimum level.

A small metallic pin 21 is inserted through a plastic or glass lens 22 which is normally placed over the dial or face of gauge 12. This relatively small metallic pin while inserted through tne gauge lens does not contact the face of the gauge itself. By properly positioning or rotating the lens the pin will be fixed at a predetermined gas cylinder pressure below which the cylinder should be replaced.

Three methods of connecting the warning device to a metal portion of the regulator-valve system are shown. All three of these methods form one leg of the electrical circuit for completing that circuit. One method is to use a metal beaded chain such as shown at 23 in FIGS. 2 and 3. In using this method the beaded chain is simply hung over a metal portion of the regulator-valve system. Another method is to use a steel clip such as shown at 24 in FIGS. 4 and 5. In this method the warning device 16 is simply hung on to a metallic portion of the regulator-valve system. A third method is to use a magnet such as shown at 25 in FIGS. 6 and 7. This magnet 25 forms one surface of the enclosure for the device 16 and is attached to any metal portion of the regulator-valve system by means of magnetic force.

In all three of the methods indicated above, the beaded chain, the steel clip, and the magnet, form one leg of the electrical circuit yet to be described.

Figure 3:
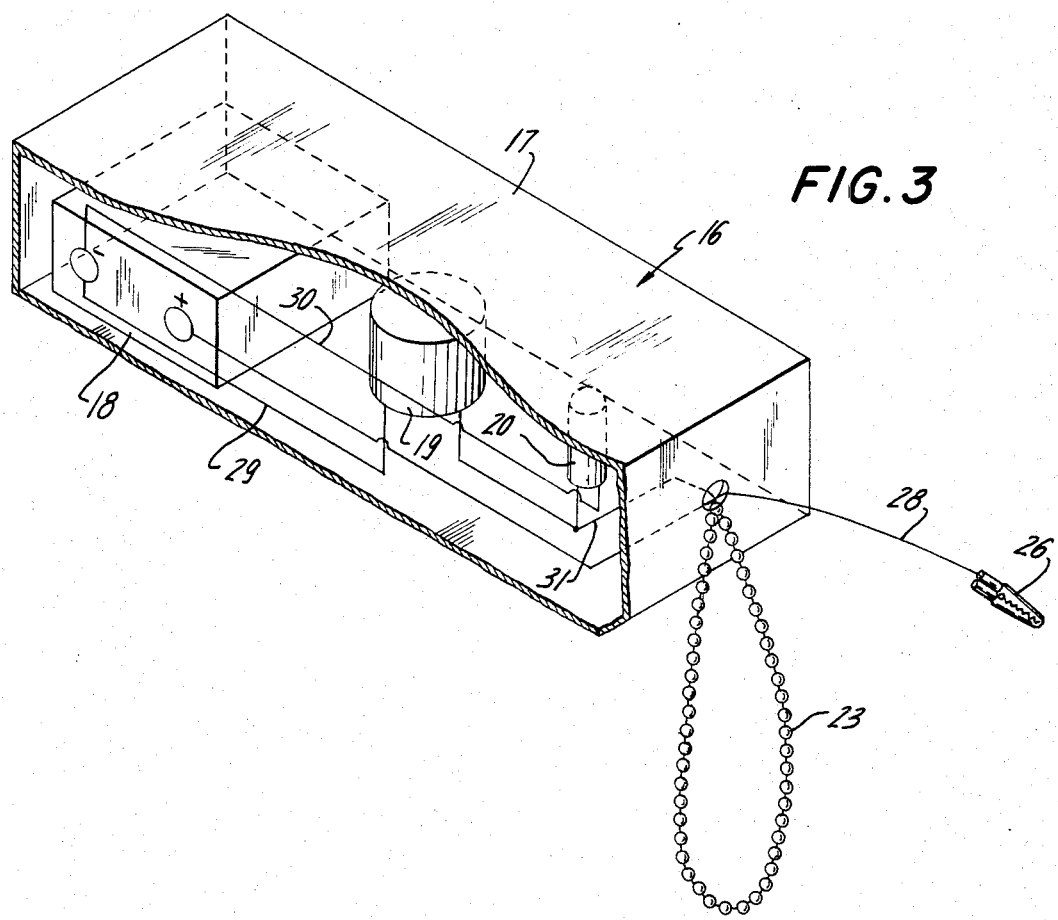
FIG. 3 is a view, partially in section, of the warning device showing the battery, piezo alert, light source, beaded chain, and the electrical circuit.

In all three of the methods indicated above the other leg of the electrical circuit is formed by either an alligator clip 26 attached to pin 21 or, in the alternative, a banana clip such as shown at 27 which may be inserted directly through a small opening in the dial lens thereby replacing pin 21. In either event, an electrical lead line 28 is connected at one end to the alligator clip 26 or banana clip 27 and at its other end is connected to the plus side of battery 18 as seen in FIG. 3 and as will be more fully described below. This electrical lead wire 28 coupled with alligator clip 26 or banana clip 27 forms the second leg of the electrical circuit as will be more fully described below.

Referring now to FIG. 3 there is shown the beaded metal chain 23 system of attaching the indicator to the regulator-valve. As previously indicated, the chain forms one leg of the electrical circuit. An electrical lead wire 29 runs from the minus pole of the battery 18 to the piezo alert audible warning device 19 and another electrical lead wire 30 is run from the minus pole of the battery 18 to the light source 20. Another electrical wire 31 runs from the piezo alert audible warning device to the beaded chain 23 and still another electrical wire 28, as previously explained, is run from the plus pole of the battery to the alligator or banana clip. The alligator clip or banana clip is then attached to the pin inserted through the face of the gauge dial as previously discussed.

Figure 5:
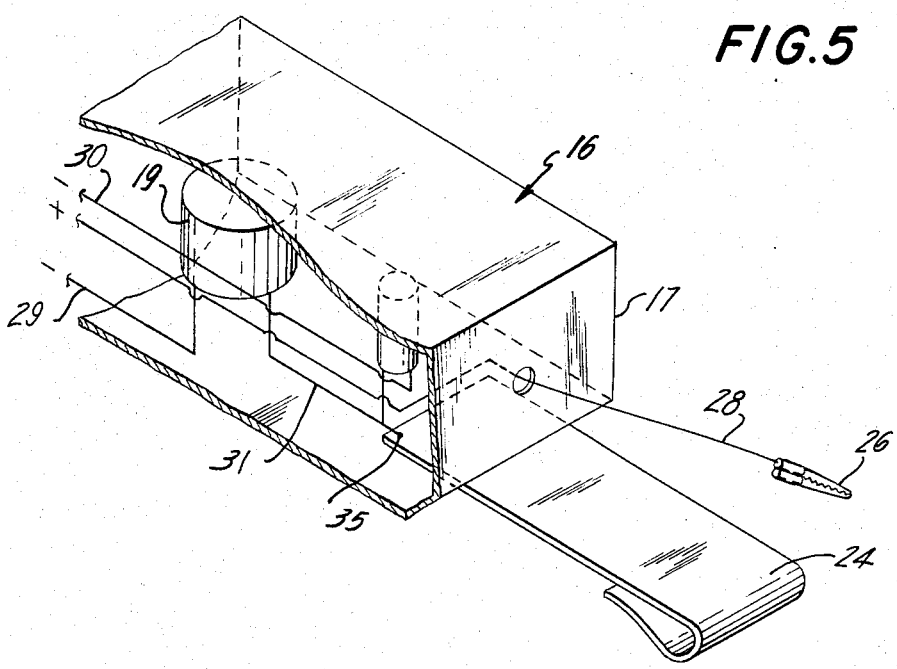
FIG. 5 is a view similar to FIG. 3 showing a fragmented view, partly in section, and showing the metal clip for hanging the warning device from the gauge-valve system.

Referring now to FIG. 5 there is shown the metal clip 24 method of hanging the device from a metal portion of the gauge-valve system which metal clip 24 forms one leg of the electrical circuit. In this method one electrical lead wire 29 is run from the minus pole of the battery to the piezo alert audible warning device 19 and another electrical lead wire 30 is run from the minus pole of the battery to the light source 20. A third electrical lead wire 31 is run from the piezo alert audible warning device 19 and then to the metal clip 24 as shown at 35. As previously explained, electrical lead wire 28 is run from the plus pole of the battery to an alligator clip or banana clip which, again, is then connected to the pin inserted through the face of the gauge thereby completing the electrical circuit.

Figure 7:
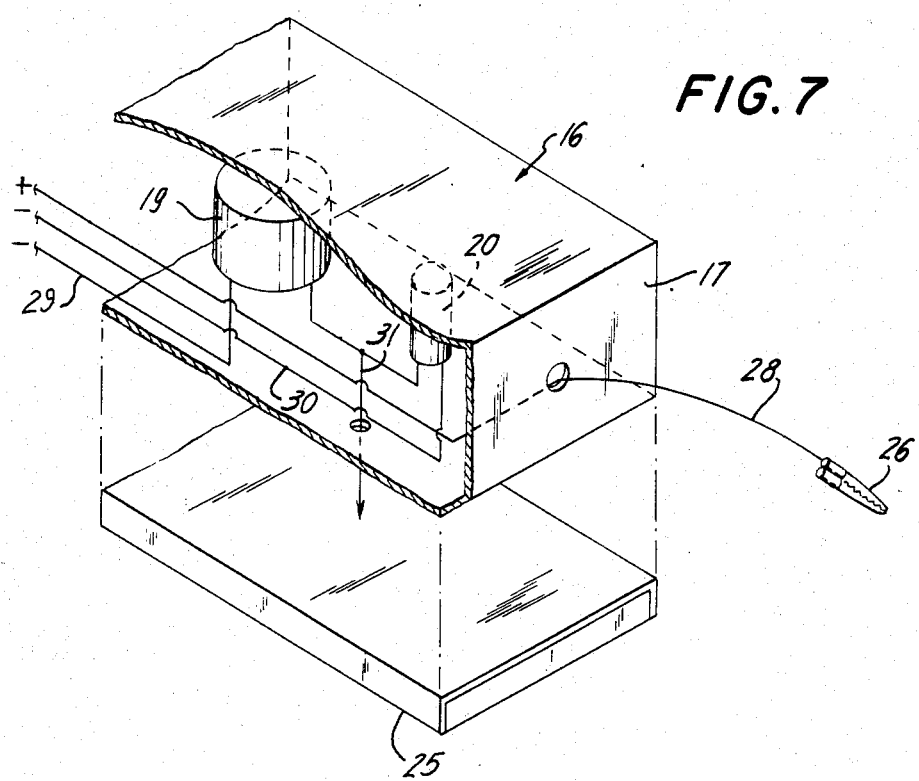
FIG. 7 is a view similar to FIGS. 3 and 5 and showing the magnet of FIG. 6.

Referring now to FIG. 7 there is shown the third basic method whereby the audible-light source battery system 16 is secured to the gas cylinder or other metal portion of the system by means of a magnet which forms one side of the warning device system. In this method, one electrical lead wire 29 is run from the minus pole of the battery to the piezo alert audible warning device and a second electrical lead wire 30 runs from the minus pole of the battery to the light source. A third electrical lead wire runs from the light source to the piezo alert audible warning device and to the magnet 25 such as shown at 31 and a fourth electrical lead wire previously described as 28 runs from the plus pole of the battery to the alligator clip or banana clip which, again, is connected to the pin inserted through the face of the dial gauge thereby completing the electrical circuit.

It is to be clearly understood that in all three methods when the banana clip is substituted for the alligator clip there is no pin inserted through the face of the dial gauge and the banana clip itself functions the same as pin 21.

OPERATION OF THE INVENTION

In operation, in any of the alternate embodiments indicated above, when the needle or indicator arm of the gauge rotates in its normal counterclockwise direction it will make contact with the metal pin inserted through the face of the dial or will make contact with the banana clip used as an alternate to the metal pin when a predetermined minimum pressure level in the tank has been reached. At this point, the electrical circuit will be completed and the piezo alert warning system will sound and the light source will flash.

It is to be clearly understood that there may be other methods of attaching the warning device sufficiently to the metal portion of the system to ground and complete the electrical circuit when the rotating indicator arm comes in contact with the pin.

What is claimed is:

1. A pressure indicator and alarm system used in conjunction with gas cylinders which will sound a warning and flash a light when the gas supply is running low and the cylinder is in need of replacement and wherein the gas cylinder further comprises a regulator, valve, and pressure gauge wherein the pressure indicator and alarm device comprises;

a housing to be attached to a metal portion of the regulator-valve system wherein the housing contains a battery, a piezo alert audible warning device, a light source, electrical lead lines connecting the said battery to said piezo alert audible warning device and said light source, an electrical lead line connecting to a means for attaching said housing to said regulator-valve system and, an electrical lead line for connecting said battery to a pin inserted through a lens of said guage into the path of a rotating indicator arm wherein when the rotating indicator arm associated with said gauge makes contact with said pin inserted through said lens an electrical circuit will be completed and the piezo alert audible warning device will sound and the light source will be illuminated.

2. The pressure indicator and alarm system of claim 1 wherein the means for attaching said housing to said regulator-valve system is a beaded metal chain.

3. The pressure indicator and alarm system of claim 2 wherein said electrical lead line for connecting said battery to said pin comprises an electrical wire connected to the +pole of said battery to an alligator clip which is then attached to the said pin inserted through said lens thereby completing said electrical circuit.

4. The pressure indicator and alarm system of claim 1 wherein said means for attaching said housing to said regulator-valve system is a metal clip.

5. The pressure indicator and alarm system of claim 4 wherein said electrical lead line for connecting said battery to said pin comprises an electrical wire connected to the +pole of said battery to an alligator clip which is then connected to said pin inserted through said lens thereby completing an electrical circuit.

6. The pressure indicator and alarm system of claim 1 wherein said means for attaching said housing to said regulator-valve system is a magnet which forms one side of said housing.

7. The pressure indicator and alarm system of claim 6 wherein said electrical lead line for connecting said battery to said pin comprises an electrical wire connected to the +pole of said battery to an alligator clip which is connected to said pin inserted through said lens thereby completing the electrical circuit.

* * * * *